US006357174B1

(12) United States Patent
Hernick

(10) Patent No.: US 6,357,174 B1
(45) Date of Patent: Mar. 19, 2002

(54) SIMULATED TREES AND ARMATURES AND KITS THEREFOR

(76) Inventor: Stanley Hernick, P.O. Box 184 Station T, Toronto, ON (CA), M6B 4A1

( * ) Notice: Subject to any disclaimer, the term of this patent is extended or adjusted under 35 U.S.C. 154(b) by 0 days.

(21) Appl. No.: 09/571,281

(22) Filed: May 16, 2000

(51) Int. Cl.[7] .................. A01G 17/04; A01G 17/06; A01G 9/12
(52) U.S. Cl. ............................. 47/45; 47/70
(58) Field of Search ................ 47/44, 45, 70, 47/42

(56) References Cited

U.S. PATENT DOCUMENTS

| 2,465,140 A | * | 3/1949 | Vila | 135/19.5 |
| 2,794,556 A | * | 6/1957 | Lego | 211/197 |
| 3,374,798 A | * | 3/1968 | Samuelson | 135/33.7 |
| 4,361,982 A | * | 12/1982 | Horowitz | 47/45 |
| 4,942,693 A | * | 7/1990 | Sibold | 47/44 |
| 5,752,341 A | * | 5/1998 | Goldfarb | 47/78 |

FOREIGN PATENT DOCUMENTS

| DE | 1482990 | * | 7/1969 | 47/45 |
| DE | 19700612 | * | 7/1998 | A01G/017/14 |
| GB | 210651 | * | 2/1924 | 47/47 L |
| GB | 2179833 | * | 3/1987 | 47/47 L |

* cited by examiner

Primary Examiner—Peter M. Poon
Assistant Examiner—Son T Nguyen

(57) ABSTRACT

A simulated tree comprises an armature including a trunk with nodes thereon from which are supported branches guyed together by shrouds to stiffen the trunk and maintain the branches in spaced relationship, with a net cover supported thereon. Vines are cultivated over the surface of the net cover, whereby a structure having a mature tree-like appearance can be grown in a relatively short period, and at much lower cost than transplanting mature trees. The profile of the armatures is easily varied by changing the position of the nodes and the length of the branches, and a wide variety of trees can be simulated using modular components. Such components are easily joined together without the use of tools, making it possible to ship the armatures in kit form, using common carriers, for assembly and erection at remote and difficultly accessible terrains.

15 Claims, 5 Drawing Sheets

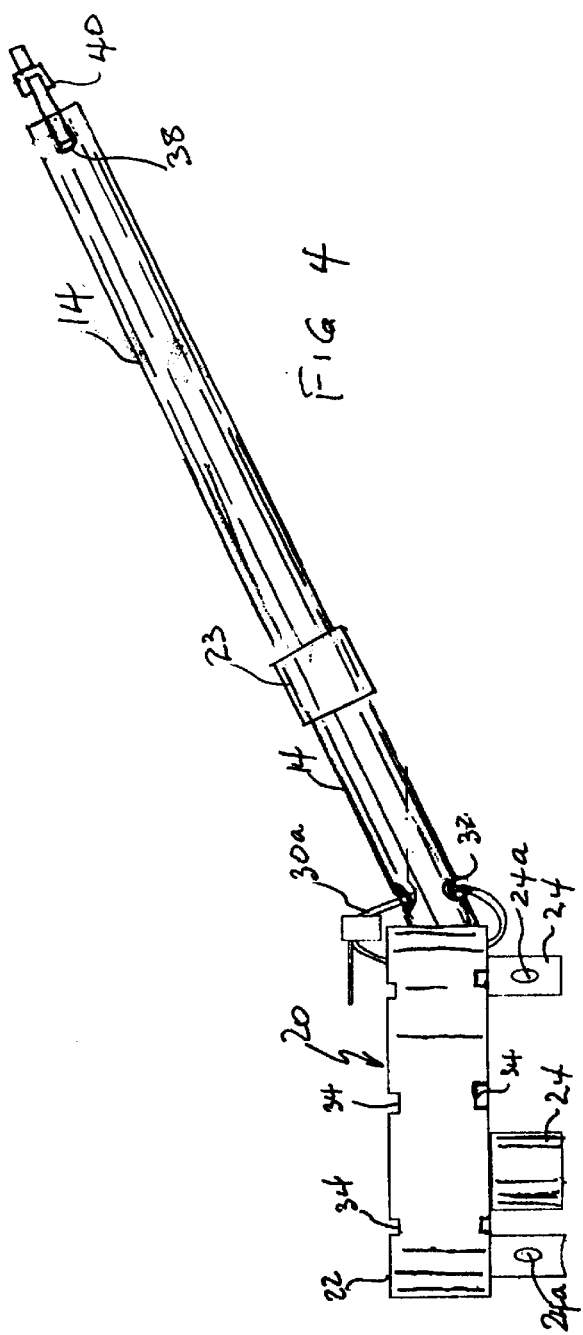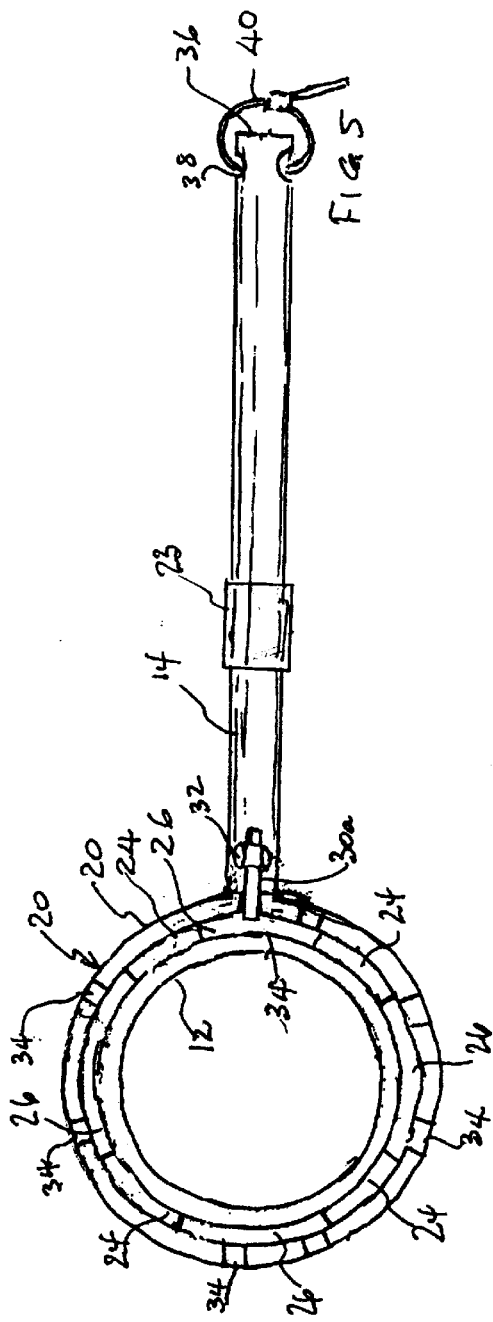

SIMULATED TREES AND ARMATURES AND KITS THEREFOR

FIELD OF INVENTION

This invention relates to armatures for supporting plant growth thereon, and to imitation trees, which may otherwise be referred to as panel trees, which comprise such armatures on which there is supported a cover of vines or other creeping plants, and/or a simulated growth.

BACKGROUND OF INVENTION

In landscaping terrains for use as golf courses or ski hills or the like, it is often desired to include trees. These may serve diverse purposes, such as channeling activity along desired paths, providing safety barriers and wind breaks, and also enhancing the scenic appearance of the terrains. Generally speaking it will take many years to grow a well finished tree to a height of about 4 m. (13 feet), and the cost of transplanting mature trees of this size will be prohibitively high, particularly where a large number of transplants is involved. Moreover, many terrains will be difficultly accessible for the heavy equipment used in transplanting mature trees.

Accordingly, there is a requirement for low cost structures having the appearance of a mature tree, or which will assume a mature tree like appearance in a relatively short period of time.

There is also a requirement for structures of the foregoing nature that are shippable as a kit of parts;, using common carriers.

There is still further a requirement for structures of the foregoing nature that are easily erectable at remote sites.

There is also a requirement for low cost, relatively permanent barrier structures.

It is well known to provide supports for plants. Generally speaking, such supports are suited for relatively small plants such as flowers, tomatoes, or small bushes, and they are not amenable to being scaled up to form mature tree like structures suited for the present purposes. One example of the prior art supports is found in British patent 9018, Buckley et al, issued Jan. 13, 1916, where there is disclosed a central post and several groups of arms radiating therefrom at spaced apart intervals, for supporting "the branches or flower stems of the plant, tree or the like". Other examples are found in British patent 10,985, Smith et al, issued Feb. 10, 1910, which discloses a central post and a plurality of similar sized concentric rings suspended thereabout by chains supported from the uppermost ring, for use as a collapsible sweet pea trainer. In U.S. Pat. No. 1,843,366, Kreimer, issued Feb. 2, 1932, there is disclosed a central post with plurality of rings which may be of different diameters, suspended therefrom at spaced apart intervals, which is indicated as being useful for supporting tomato plants. In U.S. Pat. No. 5,752,341, Goldfarb, issued May 19, 1993, there is disclosed a "radial garden" which comprises a central post having a plurality of arms supported from its upper end, and a plurality of grids hanging from the arms. According to the patentee, in an optimum garden the grids will have a height of about 2 m (6–7 feet) and a radial dimension of about 1.12 m (3.5–4 feet). A somewhat different arrangement is contemplated in U.S. Pat. No. 78,037 Wilcox, issued May 19, 1868 for a hop pole, which comprises a central pole with four upswept arms supported therefrom at its upper end, which arms are supported by cords which circumscribe the arms and which connect the arms to the pole. Persons skilled in the art will appreciate that hop poles of this nature would in all probability be used in rows with ropes or cables interconnecting the arms of adjacent poles, to form a canopy onto which the hops will grow.

It is also generally known to produce topiary like armatures which are used for supporting vines. Generally speaking, these armatures comprise a central pole on which is disposed one or more hollow shaped bodies around which the vines are trained to grow. Again, these tend to be limited in their physical size.

SUMMARY OF THE INVENTION

In accordance with my invention, armatures suitable for forming panel trees comprise a central trunk, and means for mounting the trunk from a support surface in an upright position. The armature includes an upper node and a lower node, and a plurality of intermediate nodes each supported from the trunk at spaced apart intervals. The intermediate nodes each have a group of branches associated therewith. Each branch has an inner end secured to an associated node, and an outer end radially disposed with respect to the trunk. The armature includes shrouds which serve to restrict bending moments in the trunk, and also to maintain the branches in their radially spaced relationship. Suitably, for ease of rigging the armature, the shrouds comprise a first plurality which extend in vertical planes from the upper to the lower nodes and which interconnect the branches adjacent their radially outer ends, and a second plurality which extend in generally horizontal planes respectively interconnecting the branches of each group of branches adjacent their radially outer ends. A net drapes over the shrouds to envelope the trunk and branches, and is secured to the shrouds at intervals, serving to increase the structural integrity of the assembly.

In accordance with a presently preferred embodiment, each node comprises an annulus held in concentric, spaced apart relationship with the trunk by spacer tabs, to create a plurality of node passages between the annulus and the trunk. Each branch is provided at its inner end with an opening therethrough and a flexible plastic strap, commonly known as a cable tie, loops through the node passage and the branch opening to secure the branch to the node. The shrouds of the first plurality of shrouds are looped through respective ones of the node passages of the upper and lower nodes and secured thereto by knotting or by any other convenient means. Conveniently, the outer end of each branch is also provided with an opening therethrough, through which a second cable tie is looped, and the shrouds of the first and second plurality of shrouds pass through respective ones of these outer branch end loops.

The trunk and branches suitably comprise plastic tubing, with ABS tubing of a type commonly used for water drainage systems being presently preferred. The dimensions of the tubing will depend in some measure upon the desired dimensions of the panel tree, and typically, a trunk having an external diameter of about 75 mm (3 inches) and branches having an external diameter of about 38 mm (1.5 inches) will permit the erection of an armature having a height of at least about 4 m (13 feet) and a spread of about 2.5 m (8 feet).

It will be appreciated that it is not possible to ship armatures of this size through common carriers. The armature of my invention is particularly amenable to being shipped by common carriers, in the form of a kit for assembly on site. For this purpose the trunk may be made in sections each having a length of about 1.3 to 2 m (4 to 6 ft), which are joined together on site by thee use of sleeve connectors in a known manner, to form a trunk of the desired length. The kit is, then, suitable for shipment and for on-site assembly using simple hand tools, without any expertise being required.

The mounting means suitably comprises a base including a pair of arms interconnected in a cruciform arrangement which is secured to a support surface by conventional means, to provide lateral stability to the base. Above the cruciform arms there may be provided a socket into which the bottom section of the trunk may be received. Where, as preferred, the trunk is tubular, an upstanding post may be provided above the cruciform arms, over which post the tubular trunk is fitted. The post may comprise a first, fixed portion and a second portion hingedly connected to the first portion adjacent the upper extremity thereof, to project thereabove. The trunk is assembled onto the second portion when this is inclined with respect to the first portion. Then the trunk is moved, together with the second portion about the hinge, until it assumes a vertical position, when it will slide downwardly on the first and second portions and assume its erect position.

The profile of the armature, and accordingly of the resulting panel tree, can be varied substantially on site, so as to simulate the appearance of many different species of trees. This is accomplished by varying the spread of the branches and/or the spacing between the nodes. It is contemplated, particularly where the armature is provided in kit form, that the branches be provided in modular lengths, conveniently of about 30 cm and 60 cm, and connectors to join the lengths end to end to obtain the desired spread. The spread will also depend upon the angle at which the branches are inclined. Suitably, for ease of rigging the armature, it is preferred that the branches be either horizontal or inclined at an angle of about 30 degrees on either side of horizontal, and conveniently, one end of the branches is cut square, while the other end is cut at an angle of 60 degrees. However, it will be understood that other angles of inclination of the branches may be employed, and that from a theoretical standpoint, the most stable arrangement will occur when the included angle of a shroud where it connects with a branch, is bisected by the branch.

My invention contemplates panel trees which comprise the above armatures with vines or other plant growth supported on the net cover thereof It still further contemplates panel trees wherein the natural plant growth is in whole or in part replaced or supplemented by simulated plant growth supported on the net cover. Typically, where the armatures are erected directly on a suitable ground surface, the vines are cultivated in the ground adjacent the base of the trunk; the natural propensity of vines and other creeping plants will be to extend along the net cover, and eventually this will become completely covered. It will be appreciated that the plant structure will increase the structural integrity of the armatures and the ability of the panel trees to withstand adverse weather conditions. While natural vines are usually preferred both for aesthetic reasons and for cost, artificial vines have an obvious superiority in terms of their instantaneous nature, and may as a consequence be preferred under certain conditions. Suitable vine species will be selected according to known horticultural characteristics including their hardiness for the climatic zone in which the panel trees are to be erected, the growth cycle, i.e. whether the plants are annuals, perennials or evergreens; their leaf coloration, size and density; and their flowering characteristics, for example, in much the same way in which a decision would be made regarding the suitability of a real tree species for a particular site. Vines which are likely to be suited over a wide range of conditions include Virginia creeper (parthenocissus quinquifolia), American bittersweet (celastrus scandens), Italian clematis (clematis viticella), Dutchman's pipe (aristolochia durior), trumpet creeper (campsis radicans), English ivy (hedera helix) and common hop (humulus lupulus). Where the panel trees of my invention are provided as a kit of parts for erection at remote sites, for example, the kit may include seeds of at least one species of vine for propagation about the base of the armature.

Having described the broad aspects of my invention, it will be further described in relation to preferred embodiments thereof illustrated by the accompanying drawings.

BRIEF DESCRIPTION OF THE DRAWINGS

FIG. 4 shows a side elevation a node with one upswept branch extending therefrom;

FIG. 5 shows in plan view a node assembled onto the trunk, with one branch extending therefrom;

DESCRIPTION OF THE PREFERRED EMBODIMENT

Figure 1:
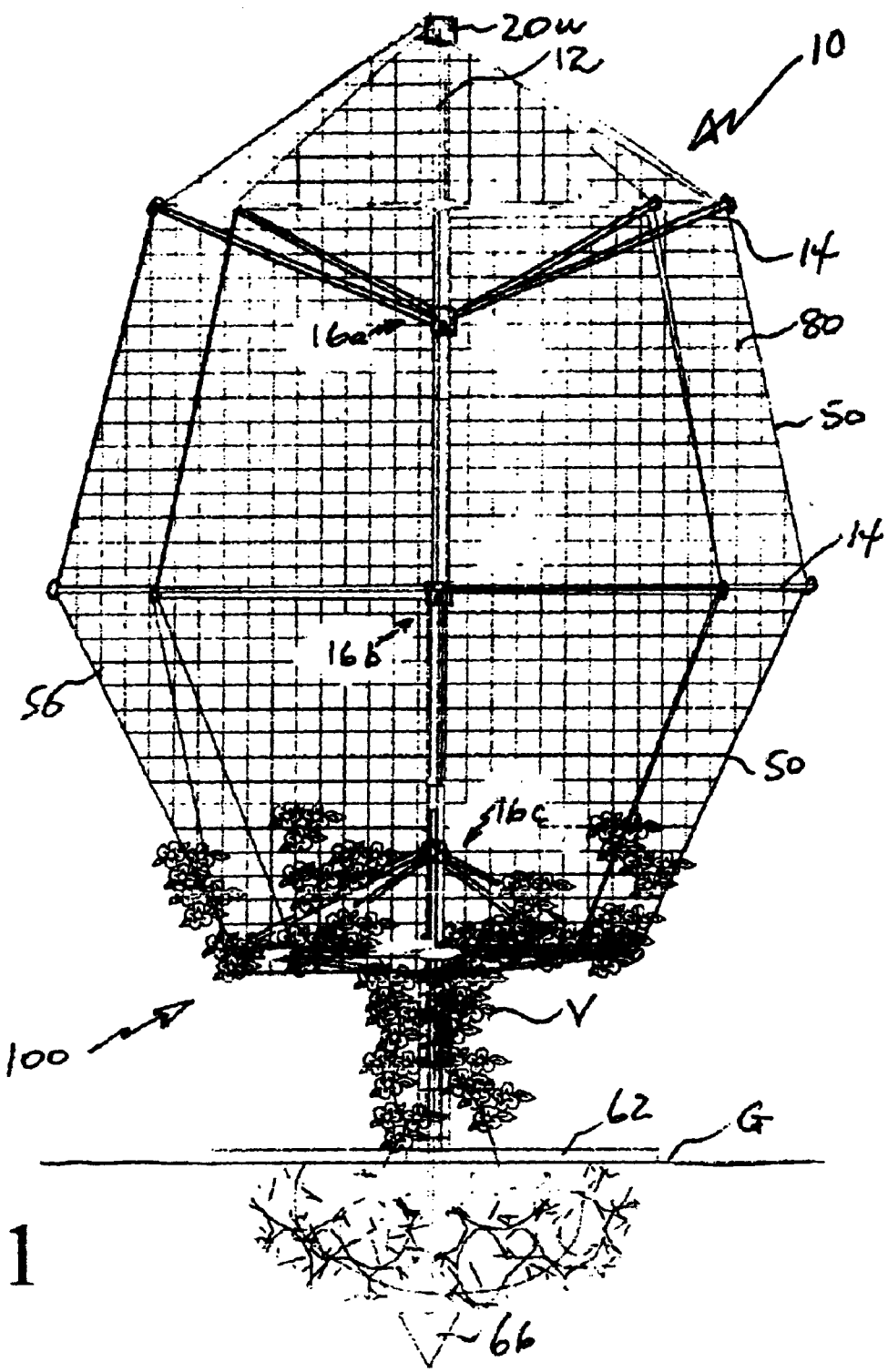
FIG. 1 shows somewhat schematically in side elevation an armature in accordance with my invention, partially covered by foliage.
Figure 2:
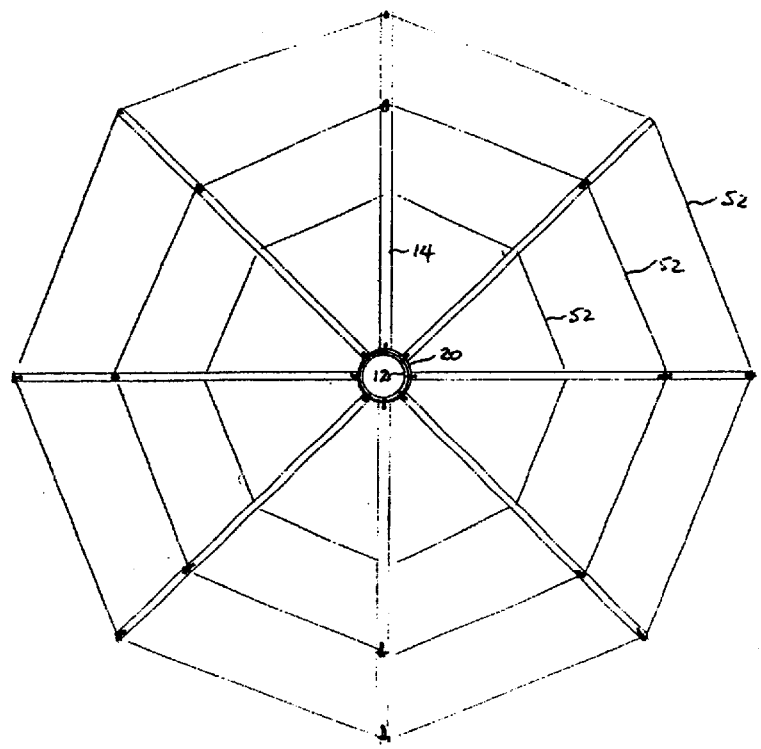
FIG. 2 is a plan view from above of the armature of FIG. 1, where in the net cover is not included for the sake of clarity.
Figure 3:
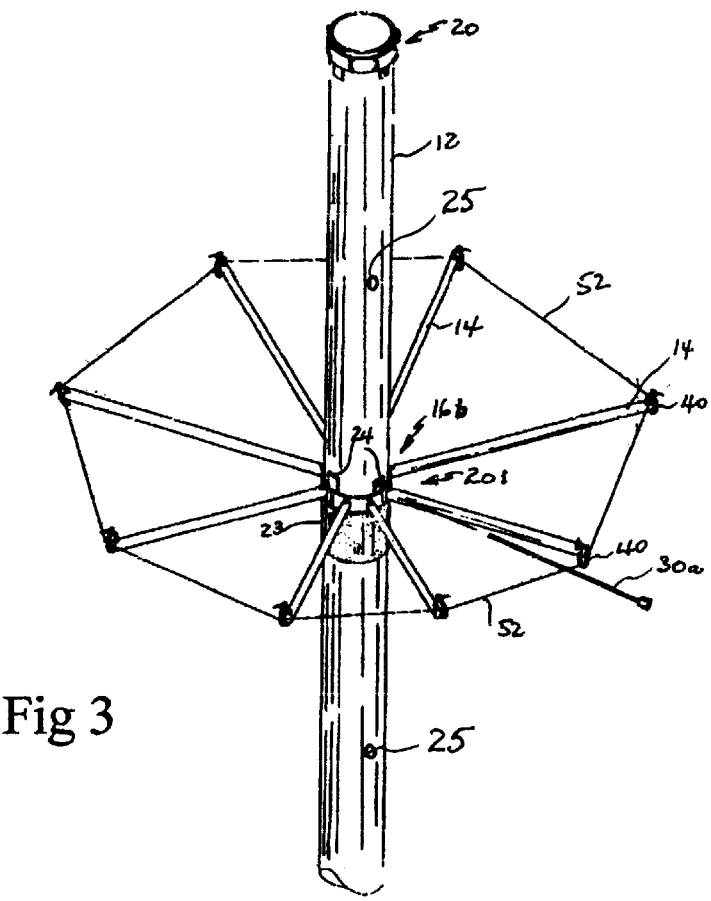
FIG. 3 shows a node and its associated branches in perspective view, assembled onto a portion of trunk.
Figure 6:
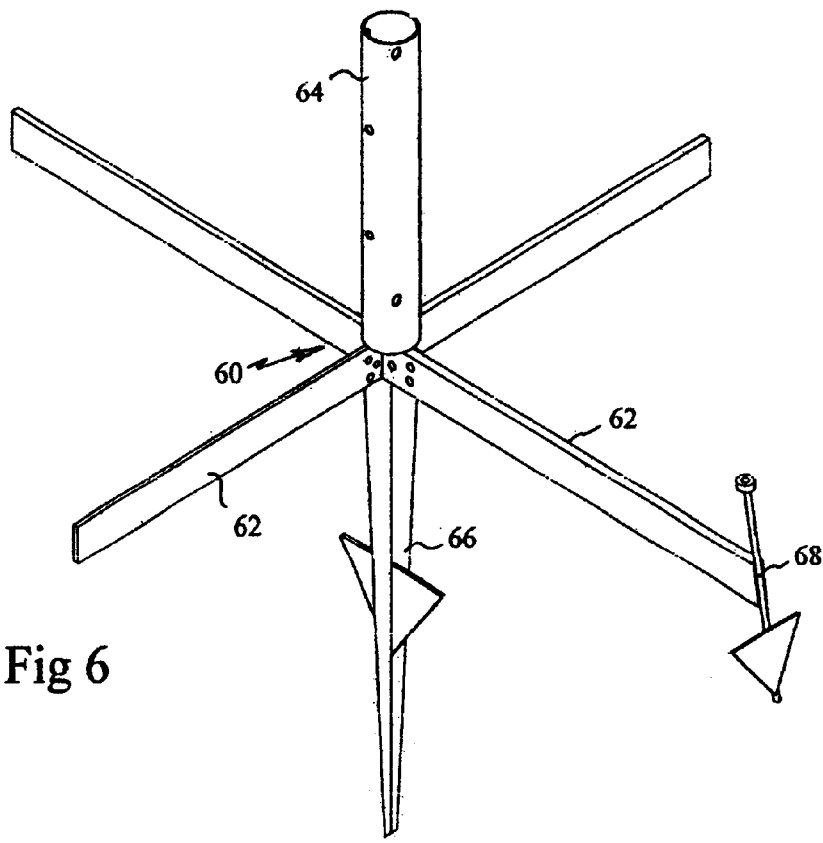
FIG. 6 shows in perspective view a base from which the central trunk of the armature may be supported.
Figure 7:
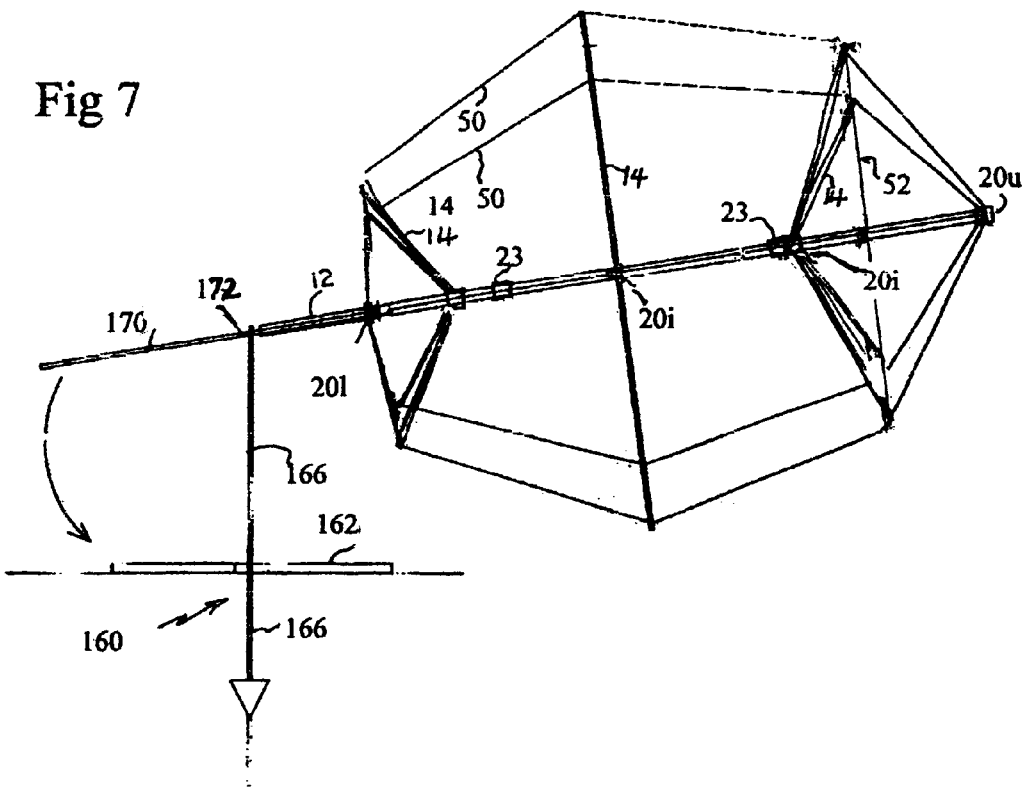
FIG. 7 shows in side elevation an armature in schematic form in the course of erection, using a second embodiment of a base support.
Figure 8C:
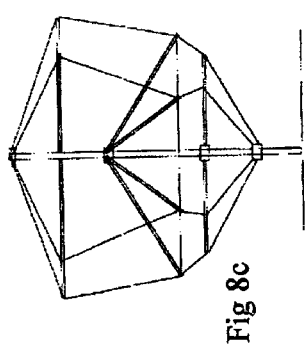
FIGS. 8a–8i show schematically various possible arrangements of armatures of my invention in side elevation.
Figure 8F:
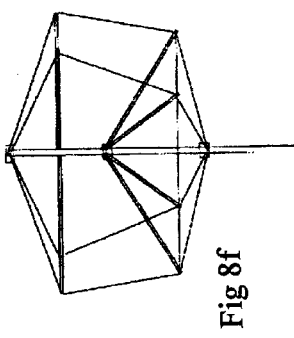
Figure 8I:
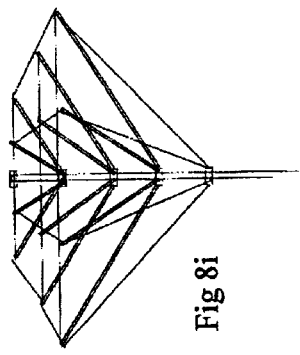
Figure 8B:
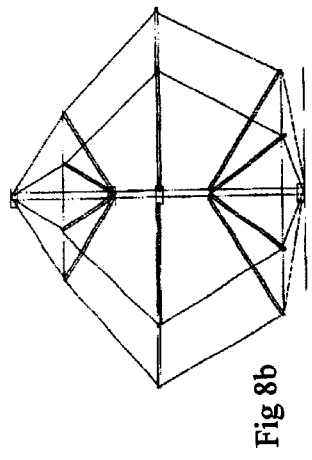
Figure 8E:
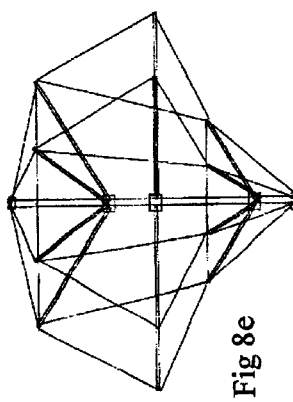
Figure 8H:
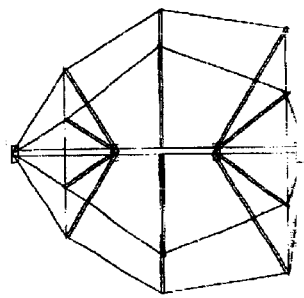
Figure 8A:
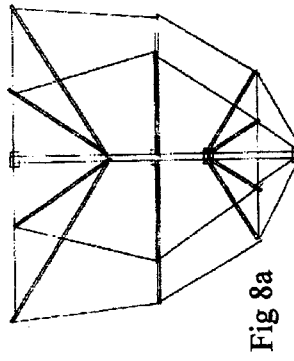
Figure 8D:
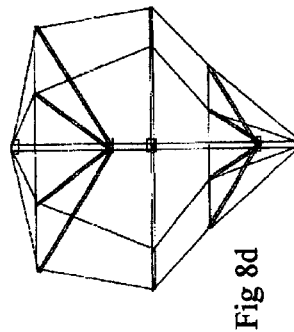
Figure 8G:
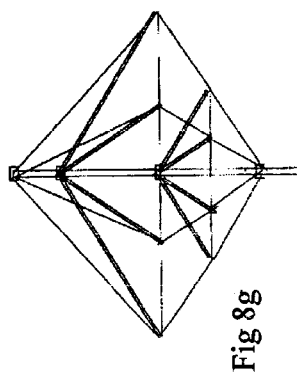

Referring to the drawings in detail, an armature in accordance with my invention is identified by the numeral 10. Armature 10 comprises a central trunk 12 and a plurality of branches 14, which as seen in FIG. 1 form three groups, 16a, 16b, 16c disposed at spaced apart intervals on trunk 12. A plurality of nodes 20, best seen in FIGS. 3 & 4, are supported on trunk 12. For the purposes of the ensuing description, nodes 20 may be distinguished as intermediate nodes 20i, each of which is associated with one group of the groups of branches 16a, 16b, 16c, and an upper node 20u and a lower node 20l, respectively disposed on trunk 12 above and below the intermediate nodes. Nodes 20 comprise an annulus, 22, from the interior wall of which there depends four tabs 24, at least two of which are in diametric opposition and have an opening 24a therethrough. The interior diameter of node 20, as measured between opposed, inwardly facing surfaces of tabs 24, is such that the nodes will slide snugly along trunk 12. Trunk 12 is suitably formed from three pieces of ABS drainage tube, each having a length of approximately 1.5 m (5 ft) which are joined together on site by adhesion using coupling sleeves 23. Prior to coupling the lengths of trunk 12 together, one intermediate node 20i is located on an intermediate portion of the trunk, so as to be captured between coupling sleeves 23, and the lower of the coupling sleeves will form a convenient seat for the captured node, if desired. Similarly, the upper of the couplings 23 may form a supporting seat for the uppermost intermediate node 20i. Where there is no seat for a node, it is supported on trunk 12 by means of a flexible plastic strap 30a, otherwise known in commerce as a cable tie, which passes through an opposed pair of tab openings 24a and corresponding openings 25 which are provided at spaced apart intervals in trunk 12. Alternatively, screws (not shown) or an adhesive may be used to secure tabs 24 to trunk 12. It may be noted that even where a sleeve 23 supports a node 20i, it is preferred to lock the node in position using a plastic strap 30a or other means. Tabs 24 have the effect of forming slots 26 between the inner surface of annulus 22 and the outer surface of trunk 12. Each branch 14 is secured to an associated node 20i by means of a plastic strap 30b, which loops through a slot 26 and openings 32 formed in the end of the branch. Notches 34 are formed in the upper and lower edges of annulus 22 to locate straps 30b peripherally in equi-spaced relationship about the annulus, while permitting some arcuate movement of branch 14, the degree of which will depend in some measure upon the degree to which straps 30b are tightened.

The radially inner end of those branches 14 that are intended to be secured to the uppermost and lowermost of the intermediate nodes 20i are cut at an acute angle to the major axis of the branch, suitably about 60°, and are disposed such that the branches attached to the uppermost intermediate node 20i are upwardly swept, while those attached to the lowermost intermediate node 20i are downwardly swept. The radially inner end of branches 14 intermediate the uppermost and lowermost groups of branches 16a, 16c is suitably cut square, whereby these branches will project more or less horizontally from their associated node 20. Following the assembly of the intermediate nodes 20i onto trunk 12, the upper and lower nodes 20u, 20l are secured on the trunk respectively adjacent the upper end thereof and somewhat above the lower end, in a similar manner to that described above.

The radially outer end 36 of each branch 14 is provided with an opening 38 therethrough, through which a plastic strap 40 similar to straps 30a and 30b is looped. A first plurality of shrouds 50 is provided, each shroud of which has its upper end secured to upper node 20u, and which is threaded through the loops formed by straps 40 of one branch 14 of each of groups 16a, 16b, 16c, and the lower end of which is secured to lower node 20l. A second plurality of shrouds 52 is provided, each shroud of which passes through the loops of straps 38 of each branch of one group of groups 16a, 16b, 16c. Each of shrouds 50 and 52 is secured so as to be under moderate tension. Trunk 12 is suitably maintained in an erect position from a ground surface G by means of a base 60. In accordance with a first embodiment, base 60 comprises arms 62 in a cruciform arrangement, from which there projects upwardly a post 64 which is adapted to be received telescopically in trunk 12. A spike 66 projects downwardly from arms 62 for retaining the base 60 in contact with ground surface G. Subsidiary spikes 68, only one of which is illustrated, are suitably provided at the outer end of each arm 62 to provide greater stability.

Given that trunk 12 may have a length of about 4.5 m (15 ft), it will be appreciated that the assemblage of the trunk and branches is quite voluminous and of moderate weight, particularly when the assemblage is covered, as will be subsequently described. The erection of the assemblage to the vertical position is facilitated using a modified base 160, which is similar to base 60, but wherein spike 166 extends substantially above ands 162. A support bar 170 is connected to the upper end of spike 166 by a bolt 172 to form a simple hinge so as to project above and below the hinge. The assemblage of trunk 12 and branches 14 is fitted onto support bar 170 when the latter is in a more or less horizontal position, following which trunk 12 may be hauled to an erect position and then lowered onto the upper end of spike 166.

Armature 10 includes a net 80 which drapes over shrouds 50, 52 and which may be secured thereto by straps such as straps 30 or as otherwise convenient. Following the erection of an armature 10 in its desired position, creeping vines V are cultivated about the base of trunk 12 to grow upwardly on net 80 and thereby form a panel tree 100.

The mesh size of net 80 is not generally critical, and may be selected according to the intended use of panel tree 100. For example, where used as a protective screen for golf courses, a mesh size may be selected so as to prevent a golf ball from passing through the net.

The sheer ie. the profile of panel tree 100 may be varied by a suitable selection of the positions of the nodes 20 and of the length of branches 14, and several different exemplary profiles are illustrated in FIG. 8a–8i wherein there are three intermediate nodes and wherein the branches associated with these intermediate nodes have a length of either 30, 60 or 90 cm (2, 3, or 4 ft) which can be readily made by joining modular branches having a length of 30 and 60 cm (1 and 2 ft). The hinged attachment of branches 14 to nodes 20i will also permit some variation in the sheer to be effected by varying the angle at which branches 14 project from the trunk 12, so as to increase or decrease their effective spread.

While in the preferred embodiment three groups of branches 16a, 16b and 16c, each comprising eight branches is shown, it will be understood that other arrangement are possible, and may be preferred. Specifically, where the height of panel tree 100 is increased, it may be desirable to increase the number of nodes. One advantage of such increase is that it permits more variation of the shaping of the panel tree. It will also be understood that other arrangement and structures of all of the parts shown in the illustrative embodiment is equally possible, and it is intended that these be included within the scope of the claims annexed hereto.

What is claimed is:

1. An armature for forming a panel tree comprising:

a central trunk;

a plurality of nodes supported from the trunk at spaced apart intervals, said nodes comprising an upper node, a lower node, and a plurality of intermediate nodes therebetween;

a group of branches secured to each intermediate node to extend radially outwardly from said trunk;

shroud means comprising a first group of shrouds extending between said upper node and said lower node to interconnect said branches, serving to restrict the bending moment of said trunk, and a second group of shrouds respectively interconnecting the branches of each group of branches, serving to maintain said branches in radially spaced relationship;

base means for maintaining said trunk erect from a support surface, and a net supported on said shrouds to envelope said trunk and branches.

2. An armature as defined in claim 1 wherein said first plurality of shrouds is arranged in vertical planes and interconnects the branches adjacent their radially outer ends, and wherein said second plurality of shrouds extends generally in horizontal planes and interconnects the branches adjacent their outer ends.

3. An armature as defined in claim 1 wherein said branches associated with the uppermost and lowermost of said intermediate nodes are upwardly swept and downwardly swept respectively.

4. An armature as defined in claim 1 wherein said branches are secured to said nodes by cable ties.

5. An armature as defined in claim 1 wherein said shrouds are interconnected to said branches by cable ties.

6. An armature as defined in claim 1 wherein said base means comprises a pair of members hinged together in a manner to facilitate the erection of said trunk onto said base means.

7. A panel tree comprising a trunk,
base means for maintaining said trunk upright on a support surface;
a plurality of groups of branches respectively disposed at nodes including an upper node, a lower node and at least one intermediate node located at spaced apart intervals on said trunk to radiate therefrom;
shroud means comprising a first group of shrouds extending between said upper node and said lower node to interconnect said branches, serving to restrict the bending moment of said trunk,
and a second group of shrouds respectively interconnecting the branches of each group of branches, serving to maintain said branches in radially spaced relationship;
a net supported on said shroud mans to envelope said trunk and said branches, and a cover supported on said net comprising at least one member selected from the group consisting of a creeping plant and simulated creeping plant to extend at least in part over said net.

8. A panel tree as defined in claim 7 wherein said creeping plant is selected from at least one variety of vine.

9. A panel tree as defined in claim 7 in which there are at least three groups of branches, wherein the effective radius of at least one of said groups of branches differs from the effective radius of at least one other group of said groups of branches.

10. A kit of parts suitable for shipment by common carrier and for erection at isolated sites to form a simulated mature tree comprising:
a plurality of trunk sections;
a plurality of connector means for joining said sections together end to end from a trunk;
a plurality of nodes for assembly onto said trunk sections;
each said node comprising an annulus having a greater diameter and that of said trunk sections, and a plurality of tabs extending from the inner surface of said annulus so as to provide a plurality of node passages between said annulus and said trunk section when said nodes are assembled thereon;
a plurality of branches, each branch having an axis therealong and axially opposed ends, with a transverse opening therethrough adjacent each said end;
flexible strap means for connecting said branches to said nodes by looping through one of said plurality of node passages and a said transverse opening through one of said plurality of branches;
shroud means for rigging said branches when mounted on said trunk in outstretched relationship and for restricting bending moments in said trunk;
a net cover draping over said shroud means when rigged on said branches and trunk; and base means for securing to a support surface and retaining said trunk in an upstanding position.

11. A kit of parts for forming a panel tree as defined in claim 10 further comprising seeds of at least one species of vine.

12. A kit of parts for forming a panel tree as defined in claim 10 wherein said base means includes a pair of hinged posts to facilitate the erection of said trunk when rigged onto said base means.

13. A kit of parts for forming a panel tree as defined in claim 10 wherein a plurality of said branches are cut at one axial end thereof at an acute angle.

14. A kit of parts for forming a panel tree as defined in claim 10 wherein said net cover is selected to have mesh openings of a size to inhibit the passage of a golf ball therethrough.

15. A kit of parts for forming a panel tree as defined in claim 10 wherein the branches comprise branches having at least two modular lengths, and wherein connectors are provided to permit the branches to be joined end to end.

* * * * *